United States Patent [19]

Symmes

[11] 4,174,239
[45] Nov. 13, 1979

[54] METHOD AND APPARATUS FOR RETREADING TIRES

[76] Inventor: Russell Symmes, P.O. Box 621, Muncie, Ind. 47305

[21] Appl. No.: 883,212

[22] Filed: Mar. 3, 1978

Related U.S. Application Data

[63] Continuation-in-part of Ser. No. 697,859, Jun. 21, 1976, abandoned.

[51] Int. Cl.² .............................................. B29H 5/30
[52] U.S. Cl. ....................................... 156/96; 156/394
[58] Field of Search ................. 156/96, 123, 126–130, 156/154, 267, 290, 291, 394

[56] References Cited

U.S. PATENT DOCUMENTS

| | | | |
|---|---|---|---|
| 2,920,682 | 1/1960 | Lindberg | 156/267 |
| 2,976,910 | 3/1961 | Nowak | 156/96 |
| 3,192,087 | 6/1965 | Close et al. | 156/267 |
| 3,236,709 | 2/1966 | Carver | 156/96 |
| 3,839,123 | 10/1974 | Sausaman | 156/96 |
| 3,846,201 | 11/1974 | Huskins | 156/96 |
| 3,895,985 | 7/1975 | Schelkmann | 156/96 |
| 3,904,459 | 9/1975 | Schelkmann | 156/96 |
| 3,919,021 | 11/1975 | Whittle | 156/97 |
| 3,925,129 | 12/1975 | Blankenship | 156/96 |
| 4,098,936 | 7/1978 | Rawls | 428/20 |

FOREIGN PATENT DOCUMENTS 2708013  9/1977  Fed. Rep. of Germany ............ 156/96

Primary Examiner—John E. Kittle

[57] ABSTRACT

Precured tread stock for retreading tires and a method of applying such a tread to a prepared tire carcass. The new tread stock has a circumferential groove at each side in which non-expansible rings are seated during curing to force the tread stock into firm engagement with the tire carcass. The area in which the ring is seated is subsequently trimmed off.

2 Claims, 11 Drawing Figures

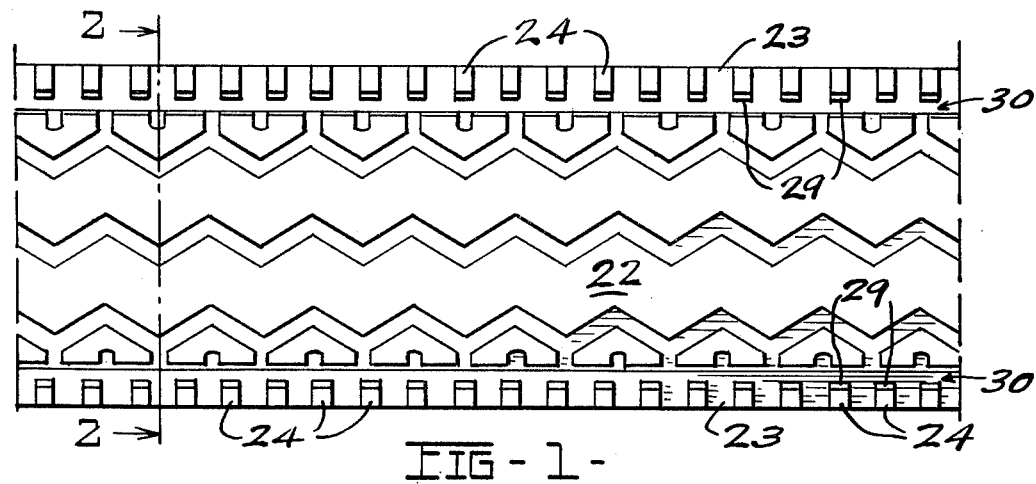
FIG-1-
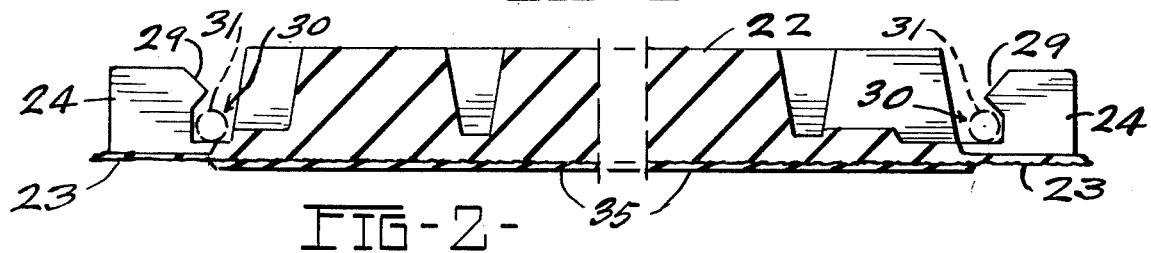
FIG-2-
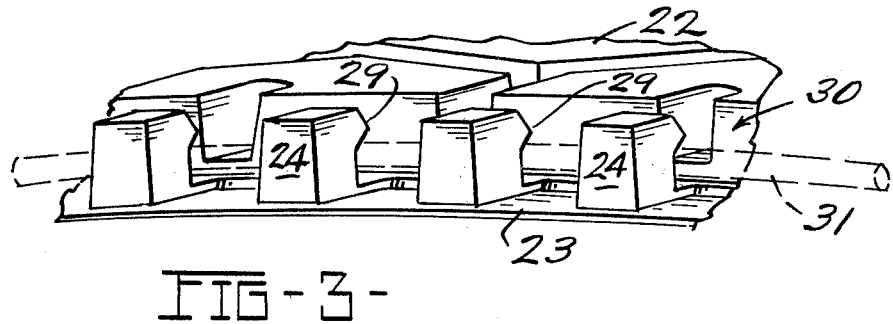
FIG-3-
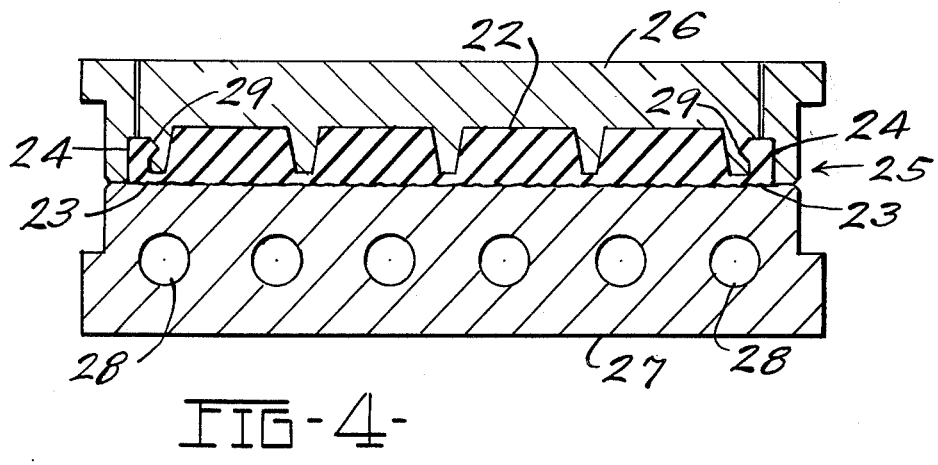
FIG-4-

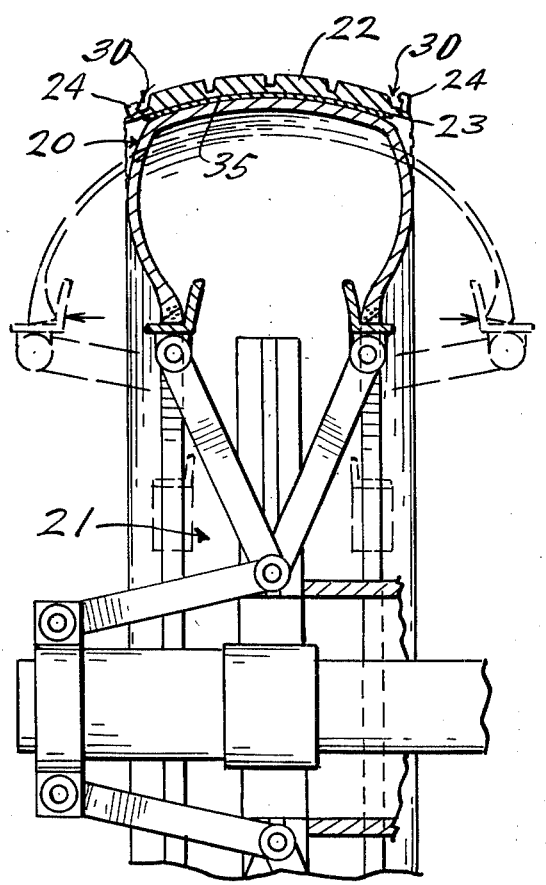
FIG-5-
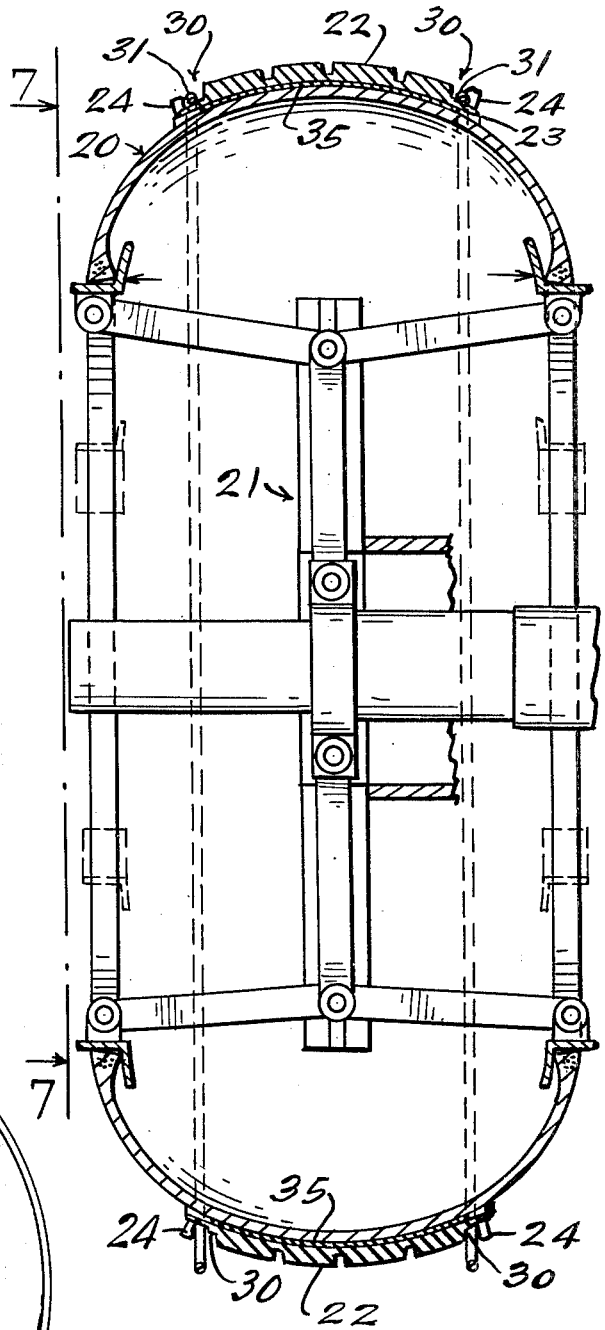
FIG-6-
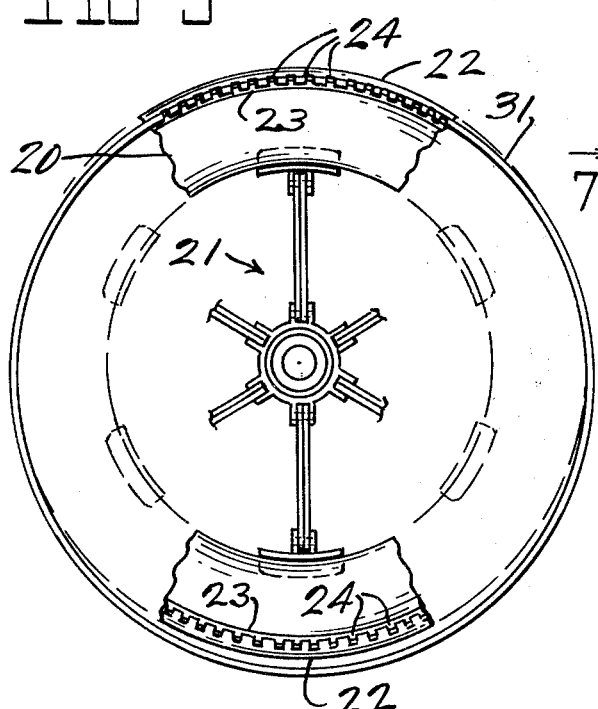
FIG-7-

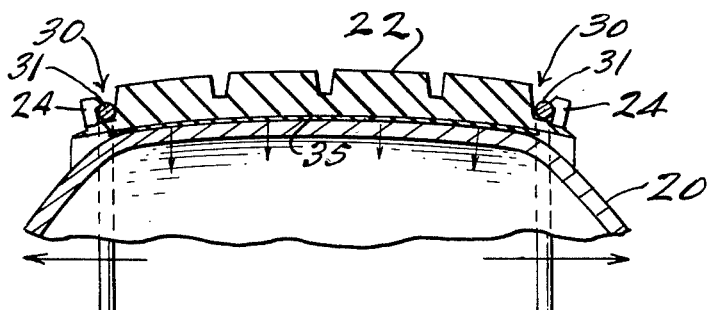
FIG-8-
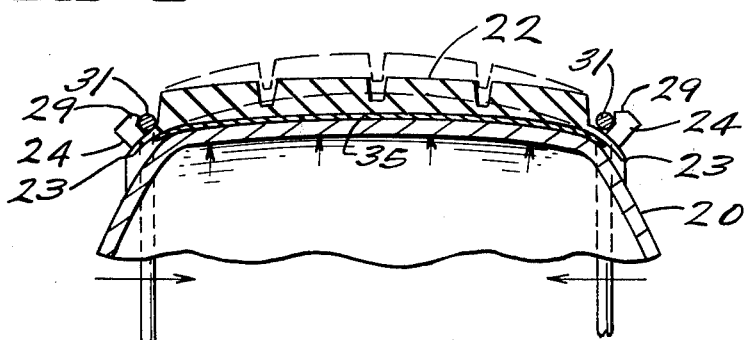
FIG-9-
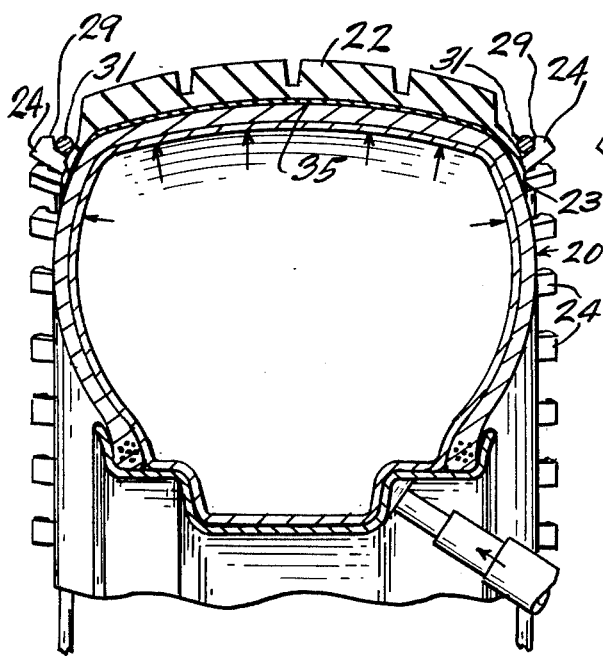
FIG-10-
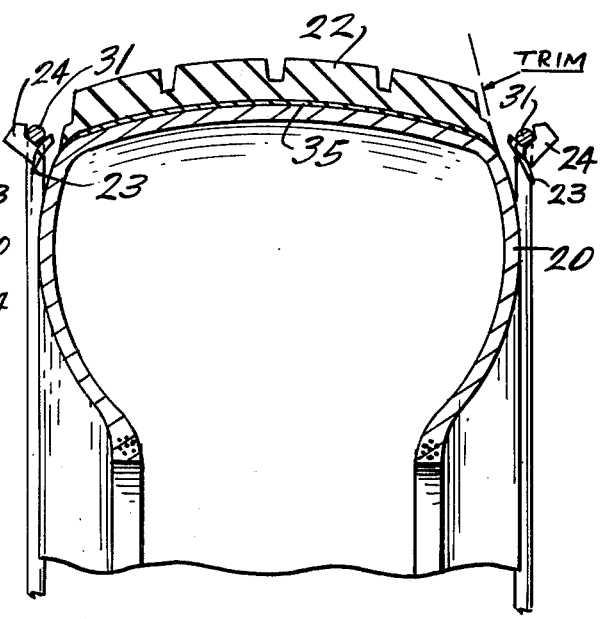
FIG-11-

METHOD AND APPARATUS FOR RETREADING TIRES

RELATED APPLICATION

This application is a continuation-in-part of my co-pending application Ser. No. 697,859 filed June 21, 1976, now abandoned.

BACKGROUND OF THE INVENTION

It has long been known that worn tires can be reconditioned by applying new tread stock to a prepared tire carcass and a whole retreading industry has been built up about this concept. In the past the new tread stock was applied to the carcass in an unvulcanized condition, the prepared tire was then put into a mold, the tire pressurized from within, and the mold was then heated to vulcanize the tread. The process was time-consuming because of the necessity of bringing the entire tire and tread to curing temperature from the mold surface inwardly, and costly because the retreading molds were expensive.

It has more recently been proposed to apply the new tread as a precured band or strip. In this method it is only necessary to cure a thin layer of cushion gum stock between the tread and prepared carcass. This can be done in a simple pressurized chamber instead of the expensive molds previously required. It has been found, however, that difficulties are encountered in achieving proper adherence between the circumferential edges of the new tread and the carcass. In applying the tread strip or band, the carcass is distorted to reduce the circumference by spreading the beads of the tire carcass apart and the tread stock is then applied and "stitched" or rolled in place to promote adhesion between the carcass and an applied cement and cushion gum layer and to eliminate, so far as possible, any air bubbles which would later on cause a failure of the bond between the applied tread and the carcass. Failure of the bond, of course, leads to throwing the tread from the tire during running, and usually at high speeds and high load.

It has been found that failure of the adhesion between the tread stock and tire carcass starts at the circumferential edges and results from the tread being insufficiently pressed against the carcass in the edge area during the curing step.

The present invention overcomes the problems previously presented to the art by continuously applying, during curing, a very high pressure to the edge area of the precured tread stock. In the invention, the tread stock is provided with a circumferential series of holding lugs which form grooves on each side of the tread. Hoops or rings having a fixed circumference are placed in the grooves while the tire carcass is on the conventional spreader and when released from the spreader, the hoops serve to draw the tread stock down over the tire carcass with a high pressure on the tread and carcass which is retained during curing. After curing, the holding lugs are cut off and the hoops removed and reused.

BRIEF DESCRIPTION OF THE DRAWINGS

FIG. 1 is a top plan view of a portion of a strip of precured tread stock prior to application.

FIG. 2 is an enlarged sectional view taken on line 2—2 of FIG. 1.

FIG. 3 is a fragmentary perspective view of the tread stock shown in FIG. 2.

FIG. 4 is a cross-sectional view of an appropriate mold for forming a length of tread stock.

FIG. 5 is a fragmentary cross-sectional view of a tire mounted on a diagrammatically indicated bead expander with the tire shown in normal position with a strip of tread stock loosely applied.

FIG. 6 is a fragmentary view similar to FIG. 5 with the tire beads separated to reduce the diameter of the tire carcass.

FIG. 7 is a side elevational view taken from line 7—7 of FIG. 6.

FIG. 8 is a cross-sectional view of a portion of a tire carcass and tread stock loosely applied thereto, with the holding rings in an initial position.

FIG. 9 is a transitional view of the elements shown in FIG. 8 with the holding rings commencing the application of pressure to the tread.

FIG. 10 is a cross-sectional view of a tire carcass and mounting rim in final position ready for curing; and FIG. 11 is a view of a finished retreaded tire with an indication of the final step in the process which comprises trimming away a portion of the tread stock and release of the holding rings.

DETAILED DESCRIPTION OF A PREFERRED EMBODIMENT

In the drawings, a prepared tire carcass is indicated at 20. It will be assumed that the carcass has been properly buffed and brought to a specific, predetermined circumference. A conventional spreader is designated 21 in FIGS. 5 and 6 and is used to receive the carcass (FIG. 5) and to reduce its diameter by spreading the beads apart (FIG. 6).

FIGS. 1, 2, 3 and 4 show the new tread stock in accordance with the invention. This tread stock includes a central wear portion 22 and wings 23 at each side thereof. Initially, a series of spaced lugs 24 is molded with the tread and wing portions in a mold 25 (FIG. 4) comprising a conventional upper mold portion 26 and a lower mold portion 27 heated in any suitable manner as by steam passages 28. The upper surface of the lower mold portion is made about as rough as a buffed tire surface for purposes which will be hereinafter explained. The length of the mold is slightly in excess of the greatest length of tread stock which will be required for a given size range of tires to be retreaded.

The lugs 24 are molded integrally at their base portions with the tread wing areas 23, and each lug is substantially rectangular in cross section near its base, but is provided with a tooth-like projection 29 facing inwardly towards the wear portions 22 to provide a groove 30 for the reception of a hoop or ring 31 indicated in dotted lines in FIGS. 2 and 3. The hoop or ring 31 is preferably made of a metal wire which results in a ring which exhibits almost no stretch when subjected to high tensile forces.

Prior to application of the tread stock to the prepared tire carcass, a layer 35 of unvulcanized adhesive rubber or "cushion gum" is placed on the tread stock underlying the central wear portion 22 but stopping short of the wings 23. Thus the tread of wear portions only will be adhered to the carcass and no adherence will take place under the wings 23 and the lugs 24.

In carrying out the method of the present invention, the new tread stock is molded to the desired tread configuration in a mold as indicated in FIG. 4. While the mold there shown will produce a precured strip of the desired length having a flat, roughened joinder surface, it should be understood that in some instances it may be desirable to impart an initial lateral curvature to the tread stock to facilitate its application to the curved exposed surface of a prepared tire carcass. In general, the length of the mold will be slightly in excess of the longest strip required to match the circumference of a prepared tire carcass in a given size range.

The prepared and buffed carcass 20 is mounted on a spreader 21. Initially, the beads of the tire are only slightly spread. However, when the spreader 21 is actuated in a known manner, the beads are spread apart as indicated in FIG. 6 and the circumference of the carcass is severely reduced. The new tread stock strip is stitched onto the carcass in the usual manner to force out all air bubbles which might be trapped between the tread and the tire carcass. At this time, the fixed dimension unextensible hoops or rings 31 are placed in the grooves 30 on each side of the tread stock. At this time, also, the insertion of the rings into the grooves is quite simple because the rings are of a greater circumference than the circumference of the reduced-diameter carcass and the rings 31 hang loosely below the tread stock as indicated in FIG. 6.

When the tire carcass is removed from the spreader as indicated in FIG. 9, the diameter of the carcass increases and the rings 31 become tight in the grooves 30. The tire and tread are then placed on a curing rim as shown in FIG. 10 and the tire is inflated to approximately 20 psi. As indicated in FIG. 9, inflation causes a relative movement between the tread stock and rings as well as an increase in diameter of the center tread area. The elements move from the position shown in full lines in this Figure to the position shown in dotted lines. The inward stretching force applied to the wings by the inextensible ring or retaining members exceeds the unit force applied inwardly in the center area of the tread stock. It will be seen that this force is derived from the interaction of the rings 31 and lugs 24. The rings 31, in effect, pull the shoulders of the tread stock inwardly along the shoulders of the tire carcass.

The entire assemblage, including the carcass, new tread stock and tread wings, is then cured by placing it in a suitable heated chamber. The heating time required is only enough to vulcanize the cushion gum layer 35. It will be appreciated that the prepared tire carcass is rough from its buffing and that the new tread stock is rough having been molded in this condition against the rough upper surface of the lower mold section 20. Adhesion is therefore promoted by this expedient.

It will be seen that the tread stock has been held firmly at its periphery to the tire carcass so that there is no chance for air to enter beneath it during the curing process. In one of the well-known present retreading processes, an envelope is used around the tire during curing. This envelope can be omitted when the present invention is used because the shoulder area is sealed off so that no air can penetrate under the tread surface during cure. In the present method, the envelope acts as an insulator and thus extends the curing time somewhat. This time extension is also eliminated by the use of the present invention.

When the completed tire is removed from the heated chamber, it is deflated and removed from its curing rim. The wings 23 and the lugs 24 are then trimmed away and the hoops or rings 31 are removed for use with the next tire. This leaves the wear area 22 of the tread stock firmly adhered to the tire carcass having been brought under extreme pressure at the side areas by the inflexible rings or hoops during the time that adhesion between the new tread and the tire carcass took place in the heated chamber. Thus the deficiencies of the prior art in failing to cure the tread stock in place with very high pressure on the edges of the tread stock have been overcome.

I claim:

1. Apparatus for the retreading of a worn and prepared tire carcass comprising a precured tread stock strip for application to the circumference of said carcass, said strip including a central wear tread area and wings extending from each side thereof, upstanding means on said wing forming a circumferential groove on each side of said wear tread area, a layer of unvulcanized cushion gum underlying only said wear tread area and stopping laterally short of said wings, and rings having a predetermined substantially fixed circumferential dimension and received in said circumferential grooves, the circumference of said rings being small enough to exert a high pressure on said tread stock during curing of said cushion gum layer, whereby the edge areas of said wear tread are held with high pressure against said tire carcass, said wing areas and lugs being trimmed away after curing of said cushion gum layer leaving said wear tread area fixed to said carcass.

2. A method of retreading worn tires which comprises
   (a) preparing a tire carcass for the reception of new tread stock,
   (b) reducing the diameter of the tire carcass by spreading the bead portions thereof apart,
   (c) applying to said tire carcass a band of new tread stock having a central tread area and lug-bearing wings extending laterally from each edge thereof,
   (d) positioning an unvulcanized adhesive layer under the central tread area of said tread stock but short of the edge wings,
   (e) stitching said new tread stock to said carcass to eliminate air bubbles and to promote an initial adhesion between the central tread area of said tread stock and carcass,
   (f) applying inextensible retaining members at each side of said carcass adjacent said lug-bearing edge wings but laterally beyond said unvulcanized adhesive layer,
   (g) relaxing said reduced diameter tire carcass to assume its normal position,
   (h) inflating said carcass to force the edges of said new tread stock into engagement with the carcass by applying to said edge wings adjacent the lugs thereon a force exceeding that applied to the central area of said tread stock, said force being derived from the interaction of said inextensible retaining members and the lug bearing edge wings of said tread stock,
   (i) heating said carcass and tread stock under pressure to cure the adhesive layer and adhere the central tread area of said tread stock to the tire carcass in the area of said adhesive layer, and
   (j) trimming away the laterally extending edge wings.

* * * * *